UNITED STATES PATENT OFFICE.

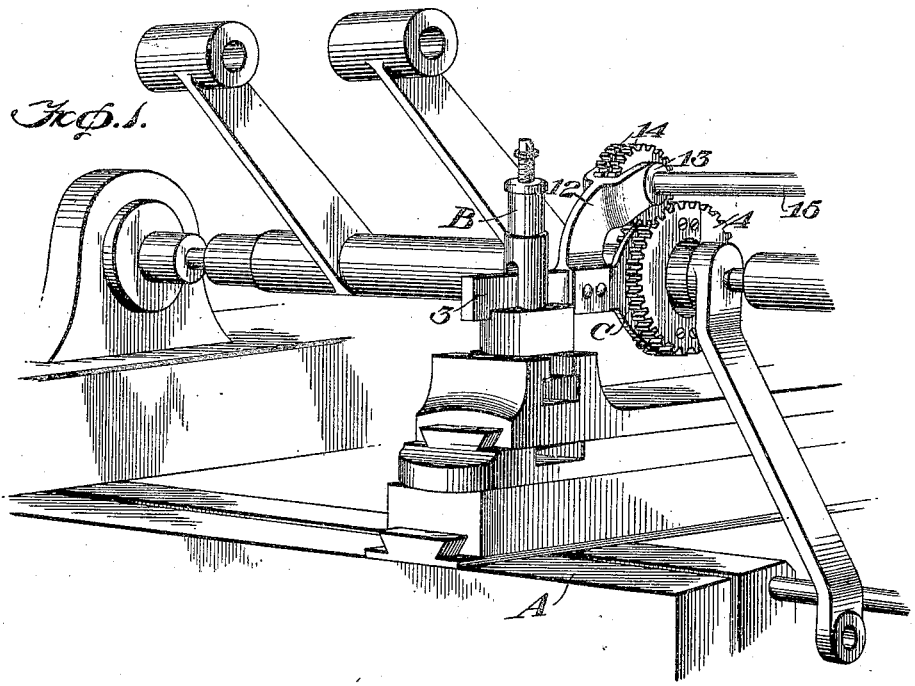

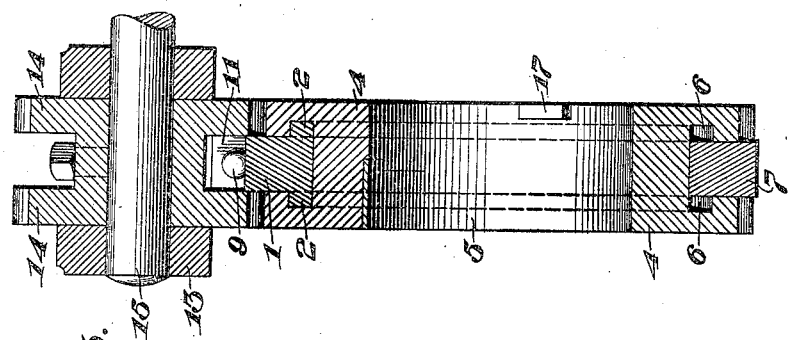
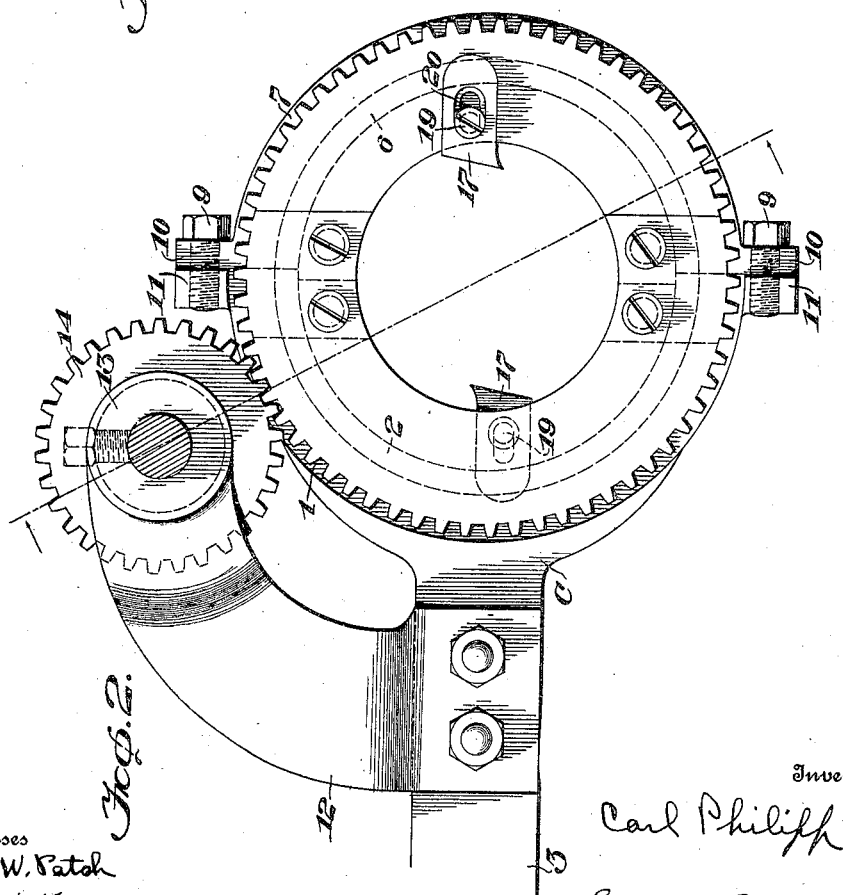

CARL PHILIPP, OF JACKSON, MICHIGAN.

LATHE ATTACHMENT FOR TURNING BEARINGS.

No. 922,327.      Specification of Letters Patent.      Patented May 18, 1909.

Application filed August 3, 1908. Serial No. 446,726.

*To all whom it may concern:*

Be it known that I, CARL PHILIPP, citizen of the United States, residing at Jackson, in the county of Jackson and State of Michigan, have invented certain new and useful Improvements in Lathe Attachments for Turning Bearings, of which the following is a specification.

My invention relates to an improvement in lathe attachments for turning bearings, and the object is to provide means for turning off tumbling shaft bearings and cranks without cutting off the ridge rod arm of the tumbling or reverse shaft of locomotives.

A further object is that the attachment can be applied to any lathe, or, if desired, can be used independently of a lathe.

The invention consists of certain novel features of construction and combinations of parts which will be hereinafter described and pointed out in the claims.

In the accompanying drawings:—Figure 1 is a view of the invention applied to a lathe; Fig. 2 is a view in side elevation of the attachment; Fig. 3 is a sectional view through the pinions and gears; and Fig. 4 is a detail.

A represents the bed of the lathe, and B is a tool post mounted thereon.

C is a bearing or head which is provided with a curved jaw 1, the jaw having flanges 2 thereon. The shank 3 of the bearing is received in the tool post B for supporting it in its operative position.

Gears 4, 4 are connected together by a webbing 5, and are made in two sections, the gears having recesses 6, 6 formed in the webbing which are counterbored to receive the flanges 2 of the bearing C. The gears are connected together by the ordinary tap connection. The jaw 7 is connected to the jaw 1 by screw bolts 9 passing through the flanges 10 and 11 on the jaws 7 and 1, respectively, thereby holding the sectional gears upon the head C. The outer surface of the jaw 7 extends outward beyond the gears 4, preventing anything from coming in contact with the gear teeth at the forward end of the attachment.

A curved arm 12 is connected to the shank 3 of the bearing C, which is provided with a forked end 13. Pinions 14, 14, are made integral with their sleeve and are mounted upon a shaft 15 in the forked end of the arm 12, the shaft 15 passing through the forked end of the arm. Pinions 14 are adapted to engage the gears 4, and the pinions being rotated through the shaft 15 thereby cause the gears 4 to rotate.

Located in suitable guide recesses in the sides of the gears are cutters or knives 17, they being adjustably held in the recesses by screws 19, which extend through elongated slots 20 in the knives.

The shaft or piece of machinery to be operated upon is passed through the central opening of the gears 4 and supported upon the lathe in the usual manner between centers. After this has been accomplished, power is transmitted to the shaft 15, which causes the pinions 14 to rotate and through their engagement with the gears 4 the gears are rotated and the shaft operated upon by the cutters or knives.

The attachment is capable of a longitudinal as well as horizontal adjustment, the shank 3 of the bearing being adjustable in the post B, and the post which is mounted upon the bed of the lathe, is capable of a longitudinal movement.

From the foregoing it will be seen that I have provided a very simple attachment which can be applied to any lathe for truing bearings of shafts, which attachment may be used independently of a lathe if desired. By this attachment the shafts can be properly centered and the bearings operated upon in any approved manner for truing them.

It is evident that more or less slight changes might be resorted to in the form and arrangement of the several parts described without departing from the spirit and scope of my invention, and hence I do not wish to be limited to the exact construction herein set forth, but:—

Having fully described my invention, what I claim as new and desire to secure by Letters Patent is:—

1. In a lathe attachment for turning bearings, the combination with a head, of gear wheels having recesses therein for supporting the gears upon the head, means connecting the gears together for retaining them in position on the head, cutters on the gears, and means for rotating the gears.

2. In a lathe attachment for turning bearings, the combination with a head having flanges thereon, of gears made in sections, said gears having recesses therein in which the flanges of the head are received for supporting the gears on the head, a web connecting each section of the gears together for retaining them in position, a driving shaft having pinions thereon in engagement with the gears for rotating the gears, and cutters on the gears.

3. In a lathe attachment for turning bearings, the combination with a tool post, of a head having a shank supported in the tool post, a jaw formed on the head having flanges thereon, a secondary jaw connected to the first-named jaw, gear wheels mounted on the flange of the first-named jaw, a driving shaft having pinions in engagement with the gears, and cutters on the gears.

In testimony whereof I affix my signature, in the presence of two witnesses.

CARL PHILIPP.

Witnesses:
MARY WATKINS,
RUDOLPH WORCH.